United States Patent [19]

Brunman et al.

[11] Patent Number: 5,564,312

[45] Date of Patent: Oct. 15, 1996

[54] INDUSTRIAL ROBOT

[75] Inventors: Barbro Brunman; Stig Persson, both of Västerås, Sweden

[73] Assignee: ASEA Brown Boveri AB, Västerås, Sweden

[21] Appl. No.: 373,576

[22] Filed: Jan. 17, 1995

[30] Foreign Application Priority Data

Jan. 26, 1994 [SE] Sweden .................................. 9400226

[51] Int. Cl.$^6$ ................................ B25J 9/12; B25J 19/00
[52] U.S. Cl. ........................ 74/490.02; 414/918; 901/23
[58] Field of Search .......................... 74/490.02; 901/23, 901/43, 50; 414/918; 310/88, 89, 112, 71; 439/271, 272, 709, 711

[56] References Cited

U.S. PATENT DOCUMENTS

| | | | |
|---|---|---|---|
| 4,492,421 | 1/1985 | Ito ........................................ | 439/271 X |
| 4,545,632 | 10/1985 | Maier et al. ......................... | 439/271 X |
| 4,659,279 | 4/1987 | Akeel et al. ...................... | 74/490.02 X |
| 4,713,568 | 12/1987 | Adams et al. ......................... | 310/71 X |
| 4,732,526 | 3/1988 | Nakashima et al. .................. | 310/88 X |
| 4,780,045 | 10/1988 | Akeel et al. ......................... | 414/918 X |
| 4,886,464 | 12/1989 | Zetena, Jr. ........................... | 439/709 X |
| 4,922,782 | 5/1990 | Kawai ..................................... | 310/71 |
| 4,954,102 | 9/1990 | Ozaki et al. ............................ | 439/535 |
| 5,063,317 | 11/1991 | Bruhn ................................... | 310/89 X |
| 5,192,888 | 3/1993 | Fleer ..................................... | 310/71 |
| 5,378,174 | 1/1995 | Brownlie et al. ....................... | 439/709 |
| 5,408,154 | 3/1995 | Meiser et al. ............................ | 310/71 |
| 5,412,272 | 5/1995 | Mensching ............................. | 310/88 |
| 5,442,248 | 8/1995 | Agnoff .................................... | 310/71 |

FOREIGN PATENT DOCUMENTS

| | | | |
|---|---|---|---|
| 3256690 | 11/1991 | Japan .................................. | 414/918 |
| 2134074 | 8/1984 | United Kingdom . | |

*Primary Examiner*—Charles A. Marmor
*Assistant Examiner*—Troy Grabow
*Attorney, Agent, or Firm*—Watson Cole Stevens Davis, P.L.L.C.

[57] ABSTRACT

A cable assembly for an industrial robot comprising power and signal cables, which by means of watertight bushings extend through a watertight connection box connected at each motor unit, such that the respective table serves all the motor units connected along the cable. Within the respective connection box the cables are unsheathed, whereby a number of conductors for the motor unit in question are deflected whereas the other conductors, without joining, together with the remaining part of the deflected conductors are left to pass to the next motor unit.

9 Claims, 2 Drawing Sheets

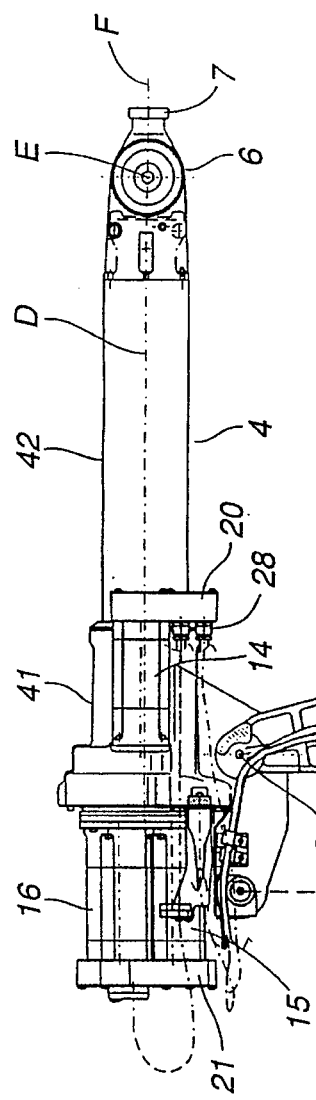
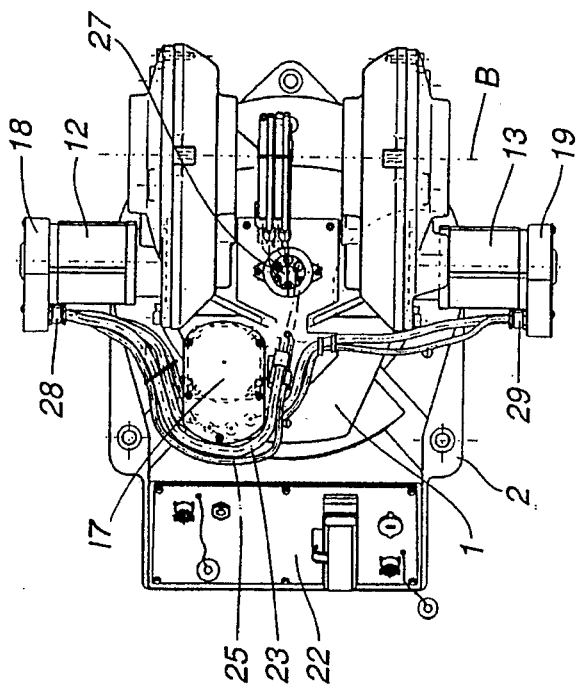
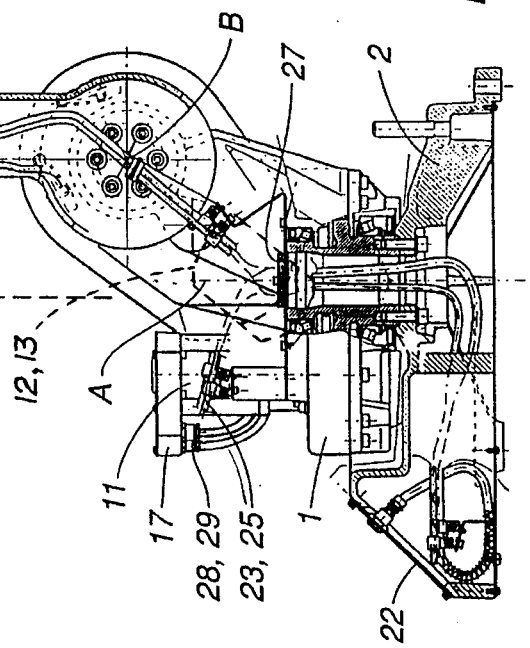
FIG. 1
FIG. 2

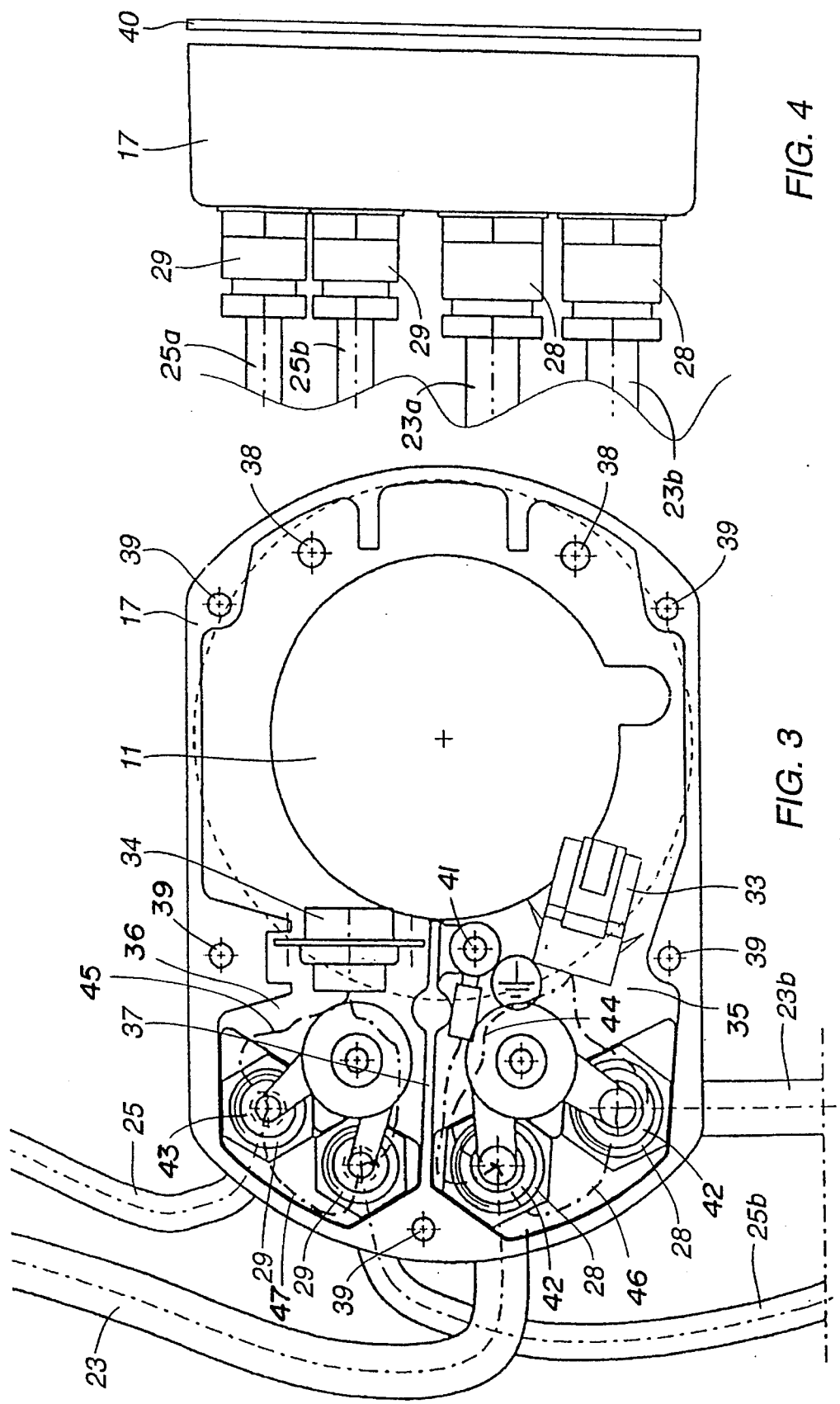

5,564,312

INDUSTRIAL ROBOT

TECHNICAL FIELD

The present invention relates to an industrial robot comprising a plurality of robot parts including a stand, robot arms and wrist parts relatively movable by motor units respectively associated therewith, a single power supply cable connected to a group of the motor units via connection boxes respectively associated with the motor units. More particularly, the invention relates to an arrangement of cable assembly for electric power and signal transmission to motor units for driving and controlling the movements of an industrial robot. The designation "cable assembly" in the following relates to an arrangement of electric cables including connection boxes, bushings, and connectors.

BACKGROUND ART

Cable assemblies in industrial robots for transmission of electricity to motors and control systems normally extend through cavities inside the robot. This provides protection against mechanical damage while at the same time the operability of the robot in narrow spaces is improved. The electric power supply and the connection of the robot to a control system are arranged via a cable body connected to the stationary foot of the robot. From here, mounted bundles of insulated conductors branch off and are connected via joints and connectors to the different motor units of the robot. The possibility of inspection and repair of these bundles of insulated conductors extending in narrow channels is limited and such work often entails lengthy shutdowns. Cable assemblies of this kind are shown in GB-A-2 134 074.

The demand for tightness against penetrating liquids, for example water, cutting fluids and hydraulic oil, means that the connectors have to be tight, or that non-tight connectors have to be enclosed in tight spaces. Also branch points and cable joints have to be protected against penetrating liquids, and hence these are often placed in tight enclosures inside the robot. The handling of casings and covers and the inspection of tightness demand a great deal of work and the design is costly. The plurality of joints and connectors also constitutes potential sources of error. The designation "watertight" in the following refers also to tightness against other liquid media such as cutting fluids, hydraulic oil, etc.

SUMMARY OF THE INVENTION

The invention aims to provide in an industrial robot a cable assembly for power supply and signal transmission, which cable assembly is characterized by uniformity, few contact and joint points and tightness against liquids, which allows shorter throughput times in production. This is achieved according to the invention by a cable assembly comprising an arrangement of power and signal cables which, via watertight bushings, extend through a watertight connection box arranged at each motor unit, such that the respective cable serves all the motor units connected along the cable. Within the respective connection box, the cables have been unsheathed, whereby the number of conductors which concern the relevant motor unit have been deflected whereas the other conductors and the remaining part of the deflected conductors are left to pass to the next motor unit without joining. The cable assembly is suitable for prefabrication which may be entrusted to a subcontractor.

BRIEF DESCRIPTION OF THE DRAWINGS

The invention will be described in greater detail by description of an embodiment with reference to the accompanying drawings, wherein FIG. 1 is a side elevational view, partly in section, of an industrial robot according to the invention, FIG. 2 is a top plan view of the robot of FIG. 1, absent, the robot arms for clarity, FIG. 3 is a plan view, at an enlarged scale, of a connection box with chassis mounted cable fittings intended to be fixed to a motor unit according to the invention, and FIG. 4 is a side elevational view of the connection box of FIG. 3.

DESCRIPTION OF THE PREFERRED EMBODIMENTS

The industrial robot shown in FIGS. 1 and 2 has a stand 1 which is rotatably journalled in a robot foot 2 secured to a mounting base, the stand being pivotable about a vertical axis A with the aid of a motor unit 11. A first robot arm 3 is pivotably journalled in the stand 1 about an axis B, and the lower end of the arm is connected to a motor unit 12 mounted on the stand. At the upper end of the arm 3, a second robot arm 4 is pivotably journalled about an axis C. The pivoting of the arm 4 is performed over a parallel bracket, which is schematically indicated by the dashed line 5 in FIG. 1. The lower end of the parallel bracket is connected to a motor unit 13 mounted on the stand.

The second robot arm 4 comprises a rear part 41, which is rotatable about the axis C, and a tubular front part 42 which is journalled in the rear part and is rotatable about the longitudinal axis D of the arm. The outer end portion of the front arm part includes a wrist, which comprises a wrist part 6, rotatable about an axis E, and a tool attachment in the form of a rotating disc 7 which is rotatable about the longitudinal axis F of the wrist part 6. For rotating the robot parts 42, 6 and 7, three motor units 14, 15 and 16, respectively, are arranged on the rear part 41 of the second robot arm 4.

The power supply to the motor units 11–16 and the signal transmission between these units and a control cabinet (not shown) are arranged by a cable assembly comprising two power cables 23, 24 and two signal cables 25, 26 which extend from connectors in a panel 22, mounted on the robot foot 2, to connection boxes 17–21 directly connected to the different motor units 11–16. The power cable 23 and the signal cable 25 serve the motor units 11–13 placed in the rotatable stand 1, whereas the mower cable 24 and the signal cable 26 serve the motor units 14–16 placed at the upper arm 4. The power cables 23, 24, the signal cables 25, 26, a hose for air and an electric cable for operating the tool of the robot extend from the panel 22 first horizontally towards the center of the stand, then deflect upwardly and vertically follow the center of the axis A up to the upper edge of the stand 1, whereupon they are divided into a first and a second cable body. At the upper edge of the stand, the different cables are controlled and kept separated from each other by a star-shaped block 27 such that the stand can be rotated about the axis A without damaging the cables. This block also protects the rotatable stand attachment against downfalling particles and parts.

The two cables 23, 25 of the first cable body first extend, via mechanical attachments, to the connection box 18 fixed to the motor unit 12. Here, the two cables extend via watertight bushings in the form of cable fittings 28, 29 first into and then out of the connection box. In similar manner, the cables are then connected to the connection box 17 at the motor unit 11 and finally to the connection box 19 at the motor unit 13, where they only enter the connection box. The cables 24, 26 of the second cable body extend in similar manner by means of mechanical attachments through the first robot arm 3 and then pass, via watertight bushings 28, 29, through the connection box 20 connected to the motor unit 14, whereupon they are connected to the connection box 21 common to the motor units 15 and 16. Power supply to each of the two groups of motor units 11–13 and 14–16, respectively, is achieved in this way by means of one and the same power cable 23 and 24, respectively, and signal transmission from the motor units in each group is achieved by means of one and the same signal cable 25 and 26, respectively. With this design, the tightness requirements for enclosure class IP 54 according to IEC Publication 529 can be fulfilled in a simple manner.

The connection boxes 17–21 are made of aluminium by die-casting. The three boxes 17–19 are identical. FIGS. 3 and 4 show how the power cable 23 and the signal cable 25 are first passed into and then out of the box 17 via watertight bushings 28, 29. Inside the connection box, the greater part of which is occupied by the space for the end portion of the motor unit 11 (not shown) with the associated connector extending into the connection box, the cables are unsheathed and the conductors 44, 45 for the motor unit in question are deflected and provided with corresponding connectors 33 and 34 for that motor unit. The remaining conductors 46, 47 are left undeflected and thus pass into the next connection box for connection to the next motor unit. Both the power and the signal cable are provided with an outer shield 42, 43, which is cut off during unsheathing, whereupon the shield of the incoming cable portion 23a, 25a is connected to a ground screw 41 in the connection box and is joined to the shield in the outgoing cable portion 23b, 25b. The connection box is divided into a power supply part 35 and a signal part 36, the latter being electrically shielded by means of a shield 37 of metal arranged across the connection box. The connection box is fixed in a watertight manner to the motor unit by screws (not shown) in through-holes 38. A cover 40 for the connection box is fixed in a watertight manner to the connection box by screws (not shown) in holes 39.

The description of the cable assembly shows how only two cables, by which the connection boxes of the motor units are linked together like chains, without joining operations and with few contact points may supply the robot with power and control signals. Because of its uniform construction, the cable assembly including the connection boxes are suited for prefabrication by a subcontractor, which permits more efficient operating routines and a shorter throughput time in the manufacture of robots.

What is claimed is:

1. An industrial robot comprising, a plurality of robot parts including a stand and robot arms relatively movable by motor units respectively associated therewith, a single power supply cable connected to a group of at least two of said motor units via connection boxes respectively associated with the motor units, said power supply cable comprising insulated conductors for individual connection of said at least two motor units in the group, said power supply cable passing through a connection box of a first of said two motor units, said cable within said connecting box of said first motor unit being unsheathed and several of the conductors being deflected and connected to said first motor unit, said power supply cable including the remaining ones of the conductors and a remaining portion of the deflected conductors passing into a connection box of a second of said two motor units in the group, the cable within said connection box of said second motor unit being unsheathed and said remaining ones of the conductors being deflected and connected to said second motor unit.

2. An industrial robot according to claim 1, further comprising a single signal cable comprising a plurality of insulated conductors for individual control of said group of motor units, the signal cable passing through the connection boxes of the motor units, said signal cable conductors being connected to control means provided in the respective motor units.

3. An industrial robot according to claim 1, wherein said connection boxes are respectively mounted directly to an end portion of the respective motor units.

4. An industrial robot according claim 1, wherein both the power cable and the signal cable are provided with an outer shield outside the connection boxes, the shield of an incoming portion of the cable being connected to a ground screw in the respective connection box, the screw being joined to the shield in an outgoing portion of the cable.

5. An industrial robot according to claim 1, wherein cable bushings are fluid tightly mounted in each of the connection boxes.

6. An industrial robot according to claim 1, wherein each of the connection boxes comprises a box-shaped part of die-cast aluminum.

7. An industrial robot according to claim 1, wherein each of the connection boxes are divided into two electrically shielded spaces by a shield of metal.

8. An industrial robot according to claim 1, wherein each of the connection boxes is arranged watertight by a cover connected to each of the motor units.

9. An industrial robot according claim 1, wherein the power cable and signal cable are guided and the interior of the stand is protected against downfalling particles by a star-shaped block located at the upper center of the stand.

\* \* \* \* \*